(12) United States Patent
Zhang et al.

(10) Patent No.: US 8,145,950 B2
(45) Date of Patent: Mar. 27, 2012

(54) EXECUTION OF A PLUGIN ACCORDING TO PLUGIN STABILITY LEVEL

(75) Inventors: Liming Zhang, Hangzhou (CN); Bo Wen, Hangzhou (CN); Yongwei Kong, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 12/798,159

(22) Filed: Mar. 29, 2010

(65) Prior Publication Data

US 2010/0251034 A1 Sep. 30, 2010

(30) Foreign Application Priority Data

Mar. 31, 2009 (CN) .......................... 2009 1 0129187

(51) Int. Cl.
*G06F 11/00* (2006.01)
(52) U.S. Cl. ........... 714/38.1; 714/25; 714/47.1; 714/48
(58) Field of Classification Search .................... 714/25, 714/38, 47, 48, 38.1, 47.1; 717/168
See application file for complete search history.

(56) References Cited

U.S. PATENT DOCUMENTS

| | | |
|---|---|---|
| 6,845,505 B1 | 1/2005 | Adunuthula et al. |
| 6,850,257 B1 | 2/2005 | Colleran et al. |
| 7,321,988 B2 | 1/2008 | Guo et al. |
| 7,398,433 B2 | 7/2008 | Benedek et al. |
| 2003/0177371 A1 | 9/2003 | Rothrock et al. |
| 2005/0149342 A1 | 7/2005 | Chao et al. |
| 2005/0166064 A1 | 7/2005 | Dive-Reclus et al. |
| 2007/0118567 A1 | 5/2007 | Isokawa |
| 2008/0022292 A1 | 1/2008 | Gibson |
| 2008/0034381 A1 | 2/2008 | Jalon et al. |
| 2008/0134140 A1 | 6/2008 | Weiner et al. |
| 2008/0249905 A1 | 10/2008 | Wong et al. |
| 2008/0307499 A1 | 12/2008 | Hill |
| 2009/0288098 A1* | 11/2009 | Abd-El-Malek et al. ..... 719/312 |
| 2010/0138639 A1* | 6/2010 | Shah et al. .................... 712/227 |

* cited by examiner

*Primary Examiner* — Charles Ehne
(74) *Attorney, Agent, or Firm* — Van Pelt, Yi & James LLP (57) ABSTRACT

Executing a plugin includes obtaining a stability level of the plugin to be executed, determining a plugin execution mode based at least in part on the stability level, and executing the plugin according to the plugin execution mode determined. The plugin execution mode is selected from a plurality of available plugin execution modes.

22 Claims, 7 Drawing Sheets

EXECUTION OF A PLUGIN ACCORDING TO PLUGIN STABILITY LEVEL

CROSS REFERENCE TO OTHER APPLICATIONS

This application claims priority to People's Republic of China Patent Application No. 200910129187.4 entitled METHOD, DEVICE AND SYSTEM FOR RUNNING A PLUGIN filed Mar. 31, 2009 which is incorporated herein by reference for all purposes.

FIELD OF THE INVENTION

The present invention relates to the field of computing and, in particular, to a technique for running a plugin.

BACKGROUND OF THE INVENTION

A plugin (also referred to as an addon, addin, snapin or extension) is typically a computer program that interacts with a core application, such as a web browser, to provide certain functions on demand. In today's networked computing environment, plugins are often used to expand the functions of core applications.

Presently, plugins typically execute in the following plugin execution modes:

1) The plugin and the core application run in the same process. In this mode the support system of the plugin is simple and the interaction efficiency between the plugin and the core application is high. However, because the plugin and the core application run in the same process, once a problem occurs in the plugin, it will directly cause the core application to behave abnormally or crash. Also, because there can be various modules in the core application, it is difficult to specifically locate the module or plugin in which the problem occurs.

2) The plugin runs outside the process in which the core application runs and each plugin occupies a separate process, thus preventing the core application from being influenced by the plugin. When the number of plugins is large, a large amount of system resources of the client will be consumed, which can lead to slower response and degraded user experience.

3) The plugin runs outside the process in which the core application runs and all plugins run in a specific process. In this mode, the system resources of the client may be saved, but when a certain plugin behaves abnormally, it may cause all of the plugins to be unavailable or abnormal. Further, it is difficult to specifically locate the plugin in which the problem occurs.

Given the number of developers for plugins and less strict quality control, the plugins often have more bugs than the core application. Thus, when the above Mode 1 or Mode 3 is employed, the operation of the core application or all the plugins may be abnormal due to the unstable execution of an individual plugin. At the same time, the resources of a client are often limited; therefore, if the above Mode 2 is employed, too much of the client's resources will be consumed and performance will tend to degrade.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
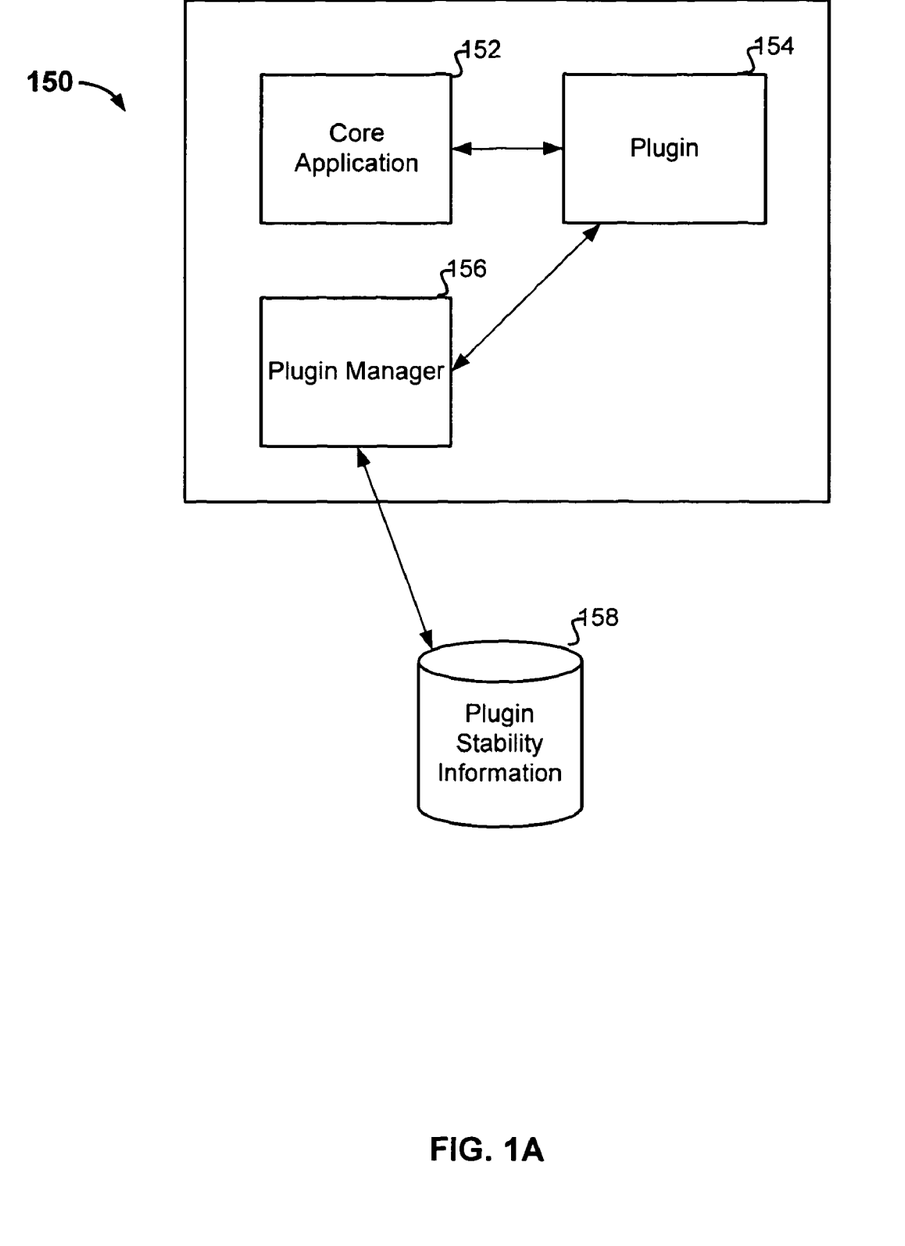
FIG. 1A is a block diagram illustrating an embodiment of an environment for executing a plugin.

FIG. 1A is a block diagram illustrating an embodiment of an environment for executing a plugin. System 150 is a device capable of executing a core application and its plugins. For example, it can be a personal computer, a mobile device, or the like that includes one or more processors configured to execute instructions provided by one or more memories. In system 150, a core application 152 is executed by the processor. A plugin manager 156, which depending on implementation may be a part of the core application or a separate process that communicates with the core application, invokes plugin 154 and coordinates the interactions between the plugin and the core application. As will be explained in greater detail below, plugin 154 may be operating in the same process as the core application or in a separate process, depending on its stability level and consequently execution mode. Plugin manager 156 has access to a plugin stability information database 158, which may reside on the same device as system 150 or on a different device such as a server. The behavior of the plugin is used to generate plugin stability information, which is recorded in database 158.

Figure 1B:
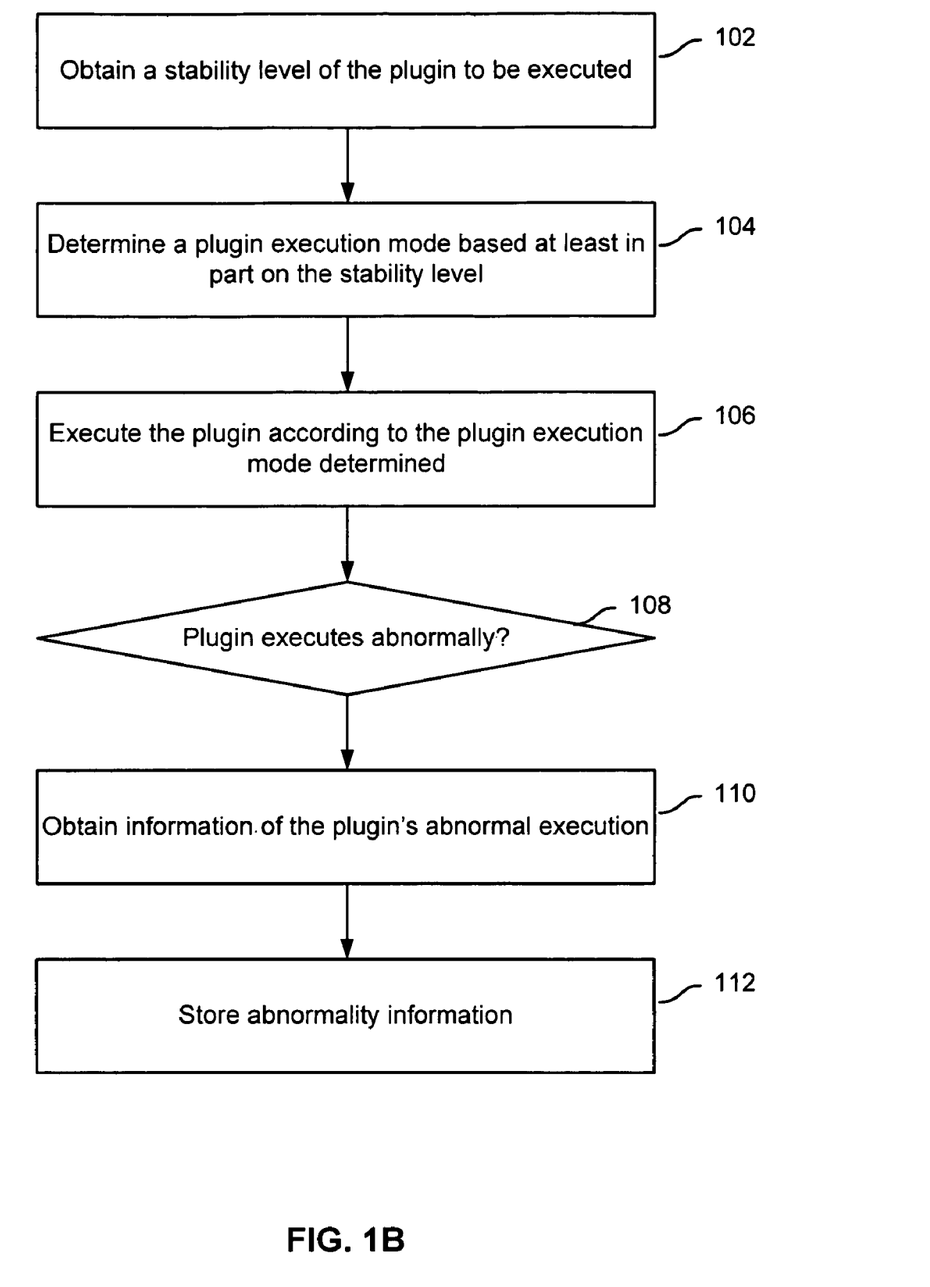
FIG. 1B is a flowchart illustrating an embodiment of a plugin execution process.

FIG. 1B is a flowchart illustrating an embodiment of a plugin execution process. Process 100 may be executed on a system such as 150.

At 102, the stability level of a plugin to be executed is obtained. In this example, the stability level of the plugin to be executed may be obtained from the plugin stability levels information saved in a database, which may reside on a server of the core application and plugin, or locally on a client device executing the core application.

In this example, the plugin stability level is determined based on observation of the execution state of the plugin during a given amount of time. The information is recorded in a database such as 158. In some embodiments, three stability levels are used: stable, ordinary, and unstable. An upper limit threshold and a lower limit threshold are set for determining the stability level of a plugin. When the abnormal frequency, i.e., the number of times the execution of the plugin becomes abnormal (as detected by the plugin manager, the operating system, or any other appropriate monitoring programs/devices), during a given amount of time is greater than or equal to the upper limit threshold, the stability level of the plugin is deemed unstable; when the abnormal frequency is less than or equal to the lower limit threshold, the stability level of the plugin is deemed stable; and when the abnormal frequency falls between the lower limit threshold and the upper limit threshold, the stability level of the plugin is deemed ordinary. In some embodiments, only two stability levels, stable and ordinary, are used. Thus, only one threshold is used. When the abnormal frequency is greater than the threshold, the stability level of the plugin is ordinary; otherwise, it is stable. In some embodiments, four stability levels are used: stable, relatively stable, ordinary, and unstable. Three thresholds are used in this case. Accordingly, when the abnormal frequency is greater than or equal to the first threshold, the stability level of the plugin is unstable; when abnormal frequency is greater than or equal to the second threshold and less than the first threshold, the stability level of the plugin is ordinary; when the abnormal frequency is greater than or equal to the third threshold and less than the second threshold, the stability level of the plugin is relatively stable; and when the abnormal frequency is less than the third threshold, the stability level of the plugin is stable. The numbers of stability levels and thresholds may vary in other embodiments depending on implementation.

Here, a corresponding relationship between plugin and stability level may be established, for example by the plugin manager, and the stability level of a plugin to be executed may be obtained after the identification information of the plugin to be executed is determined.

At 104, the plugin execution mode is determined based at least in part on the stability level. Here, the plugin execution mode is selected from a plurality of available execution modes. In some embodiments, a mapping table or the like is used to map the relationships between the available execution modes and the respective possible stability levels. The appropriate plugin execution mode is selected using the stability mode determined based on the mapping table. The corresponding relationships between stability levels and execution modes are predetermined and stored either on the client device or on the server.

In some embodiments, multiple loader processes are available for loading and executing plugins with different plugin stability levels. A loader process is an executable program that may be initiated by the core application or by other programs in the operating system. Different types of loader processes include the shared loader process and the independent loader process. Multiple plugins can be executed in a shared loader process, while only one plugin can be executed in an independent loader process.

An example relationship between stability level and plugin execution mode is as follows. When the stability level of the plugin is stable, the plugin execution mode causes the plugin to execute in a shared loader process to reduce the amount of resource consumed. When the stability level is ordinary, the plugin execution mode causes an independent loader process to be started and the plugin to be executed in an independent loader process. A plugin with ordinary stability level is run in an independent loader process to prevent problems that occur during the execution of the plugin from influencing or destabilizing the core application, thus improving overall performance and stability. When the stability level is unstable, the plugin execution mode causes the execution of the plugin to be aborted, or cause the user to be notified about the aborted operation and let the user decide whether to continue to run the plugin. If the user selects to continue, an independent loader is started to run the plugin; otherwise, the execution of the plugin is aborted.

In some embodiments, the stability levels additionally include a relatively stable level. When stability level is relatively stable, the plugin execution mode causes the plugin to be executed in a shared loader process. In various embodiments, the shared loader of the relative stable level may be the same one as the shared loader that corresponds to stable level, or a separate shared loader.

At 106, the plugin is executed according to the plugin execution mode determined in 102.

The plugin may behave abnormally during its execution. For example, it may crash, run out of memory, or experience other performance issues. Thus, process 100 optionally includes steps to handle such abnormal behavior. In the example shown, at 108, in the event that the plugin executes abnormally, information of the plugin's abnormal execution is obtained at 110 and the abnormality information is stored at 112. The abnormality information includes, for example, the reason for the abnormality and plugin information about the plugin that is executed. The reason for the abnormality includes, for example, crash of the loader process, unexpected termination of the plugin execution thread, overconsumption of memory, or processor cycles by the plugin, etc. The plugin information includes, for example, identifier information, name, and version of the plugin, etc.

In some embodiments, the client, the server, or other parts of the system, or a combination thereof, is configured to automatically determine the plugin stability level according to the abnormality information of the plugin's execution and adjust it periodically. That is, the client or the server may determine the number of times a plugin becomes abnormal in a specified period of time using the abnormality information saved and adjust the stability level of the plugin according to the number of times the plugin behaved abnormally. In some embodiments, after a given amount of time is reached, the number of times plugins behaved abnormally during this time is determined. If the number exceeds a threshold, the stability level of the plugin is automatically adjusted. The number of abnormal occurrences is reset to 0 for the next cycle. In some embodiments, the stability level of the plugin is adjusted manually. That is, a system administrator can observe the execution state of a plugin in a given time and modifies the stability level of the plugin when the number of times the plugin becomes abnormal in a given time exceeds a given value.

The plugin execution process of a network tool executing on a client may be managed by the core application of the network tool or by other programs in the client. Where, in this embodiment, the core application not only provides the core service of the network tool, but also includes a program that manages the plugin. Loader process is an independent and executable program in the client and the core application may also be a loading process.

Figure 2:
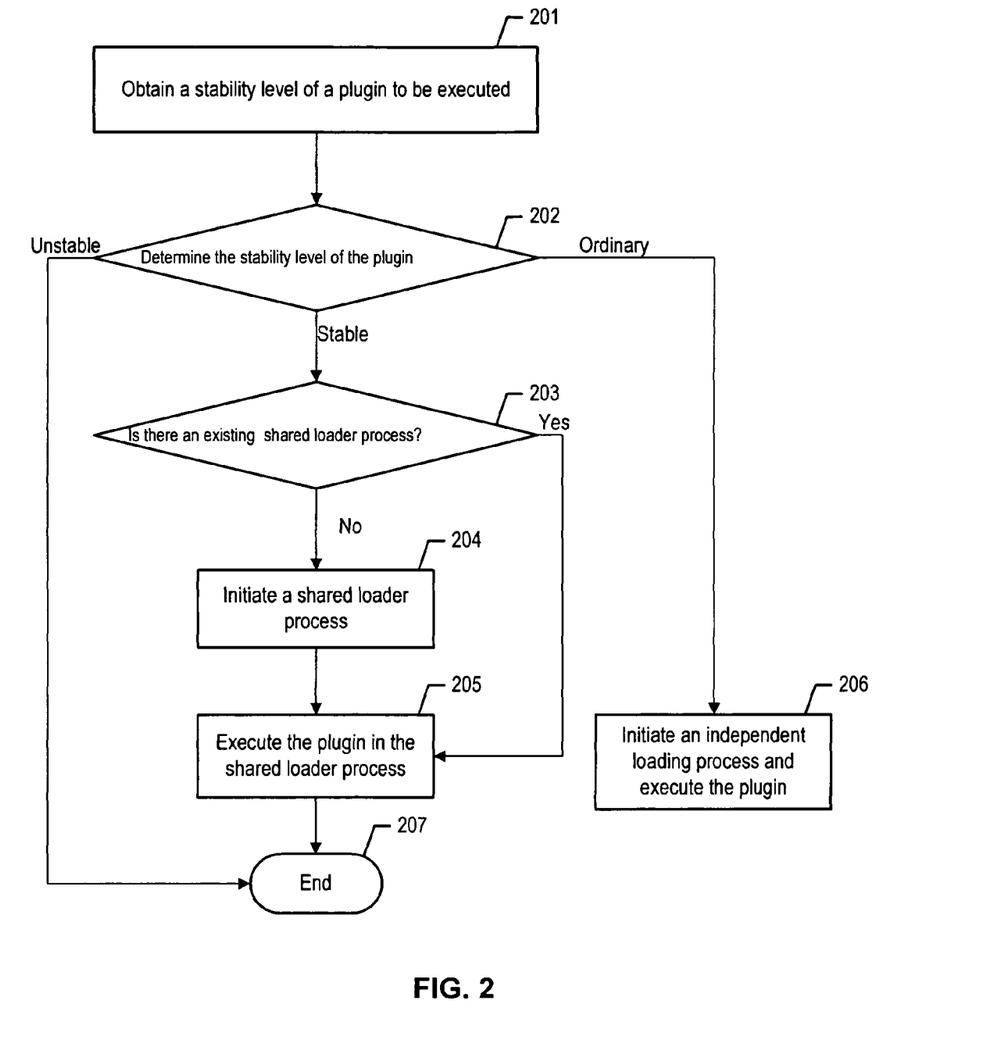
FIG. 2 is a flowchart illustrating another embodiment of a process for executing a plugin.

FIG. 2 is a flowchart illustrating another embodiment of a process for executing a plugin. Process 200 may be executed on a system such as 150.

At 201, a stability level of a plugin to be executed is obtained. In this example, when the core application requests to a server for obtaining the stability level of a plugin to be executed, the server obtains the plugin information such as the identifier information and queries the stability level of the plugin using the identifier information, based on the saved mapping information of the plugin and its stability level, returns the stability level queried to the core application, and increases the number of execution times of the plugin by 1. In this example, possible stability levels include stable, ordinary and unstable.

In some embodiments, the core application obtains the stability level of a plugin to be executed from a local client. The client queries the stability level of the plugin to be executed in a database of plugin information, returns the stability level queried to the core application, and increments the number of execution times of the plugin by 1.

At 202, the stability level of the plugin to be executed is determined. When the stability level is stable, control is passed to 203; when the stability level is ordinary, control is passed to 206; and when the stability level is unstable, control is passed to 207.

At 203, whether there is already an existing shared loader process is determined. When there exists a shared loader process, control is passed to 205; when there exists no shared loader process, control is passed to 204. At 204, a shared loader process is initiated. At 205, the shared loader process loads the plugin to be executed. At 206, an independent loading process for the plugin with an ordinary stability level is initiated, and the plugin is executed in the loading process. At 207, the plugin execution ends.

In this example, when there is no shared loader process, a shared loader process is initiated in 204. Here the core application may also be directly used as a shared loader and a plugin that is deemed stable may be run in the same process as the core application.

In some embodiments, when the execution of a plugin becomes abnormal, the client may also obtain the abnormality information of the plugin, save the abnormality, information and/or send it to the server. Since plugins are all executed in loader processes, when the execution of a plugin becomes abnormal, the loader process also becomes abnormal. Thus, in some embodiments, the client obtains the abnormality information of the loader process, saves the abnormality information, and optionally sends it to the server.

Figure 3:
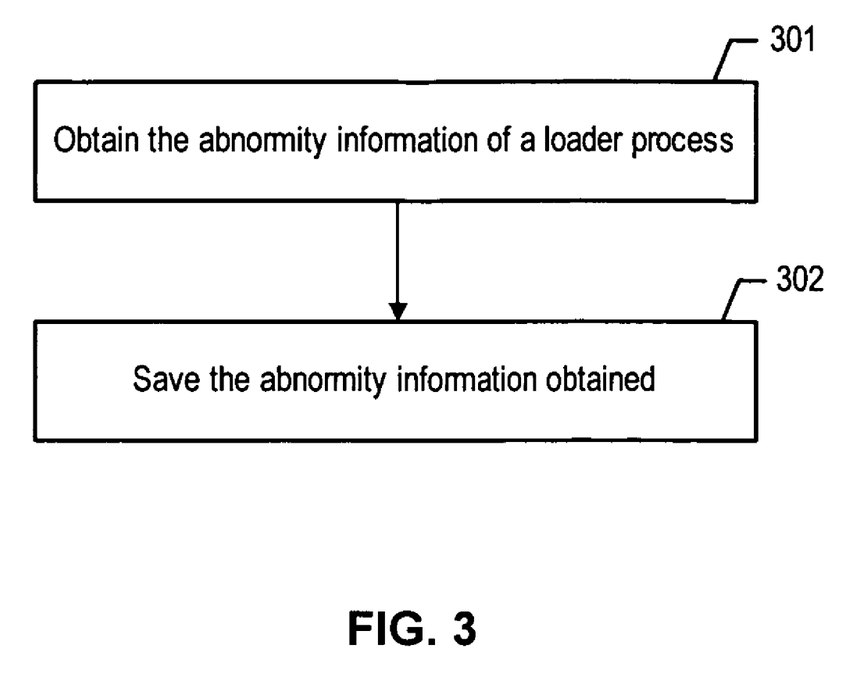
FIG. 3 is a flowchart illustrating an embodiment of a process for recording abnormality information.

FIG. 3 is a flowchart illustrating an embodiment of a process for recording abnormality information. Process 300 may be performed on a system such as 150.

At 301, the abnormality information of a loader process is obtained. When the loader process is an independent loader process, the abnormality information includes the abnormality reason and plugin information of the plugin that is running in the independent loader process; when the loader process is a shared loader process, the abnormality information includes the abnormality reason and plugin information of all plugins running in the shared loader process. The abnormality information may also include abnormality context of the loader process. Here, the abnormality context includes: technical information such as memory image of the loader process, function stack context and plugins loaded in the loader process, etc. The time point corresponding to the context, the plugins running in the loader process, the instructions executed currently, etc., can also be obtained.

The client may obtain the abnormality reason of the loader process via detection. The abnormality reason may be loader process crash, unexpected plugin execution thread termination, or too much memory or processor resource consumption by the plugin for along time. Here, the loader process may determine the abnormality reason via self check or the abnormality reason may be determined by detecting the loader process via other checking programs of the client.

The client may also obtain the abnormality information of the loader process in the form of periodic heartbeat report; that is, the loader process sends a message, which is a so-called heartbeat, to the core application periodically, when the core application of the client does not receive a heartbeat report of the loader process in a given time, it indicates that the loader process becomes abnormal.

At 302, the abnormality information is saved. In some embodiments, the information is sent from the client to the server. In some embodiments, the information is saved locally.

Figure 4:
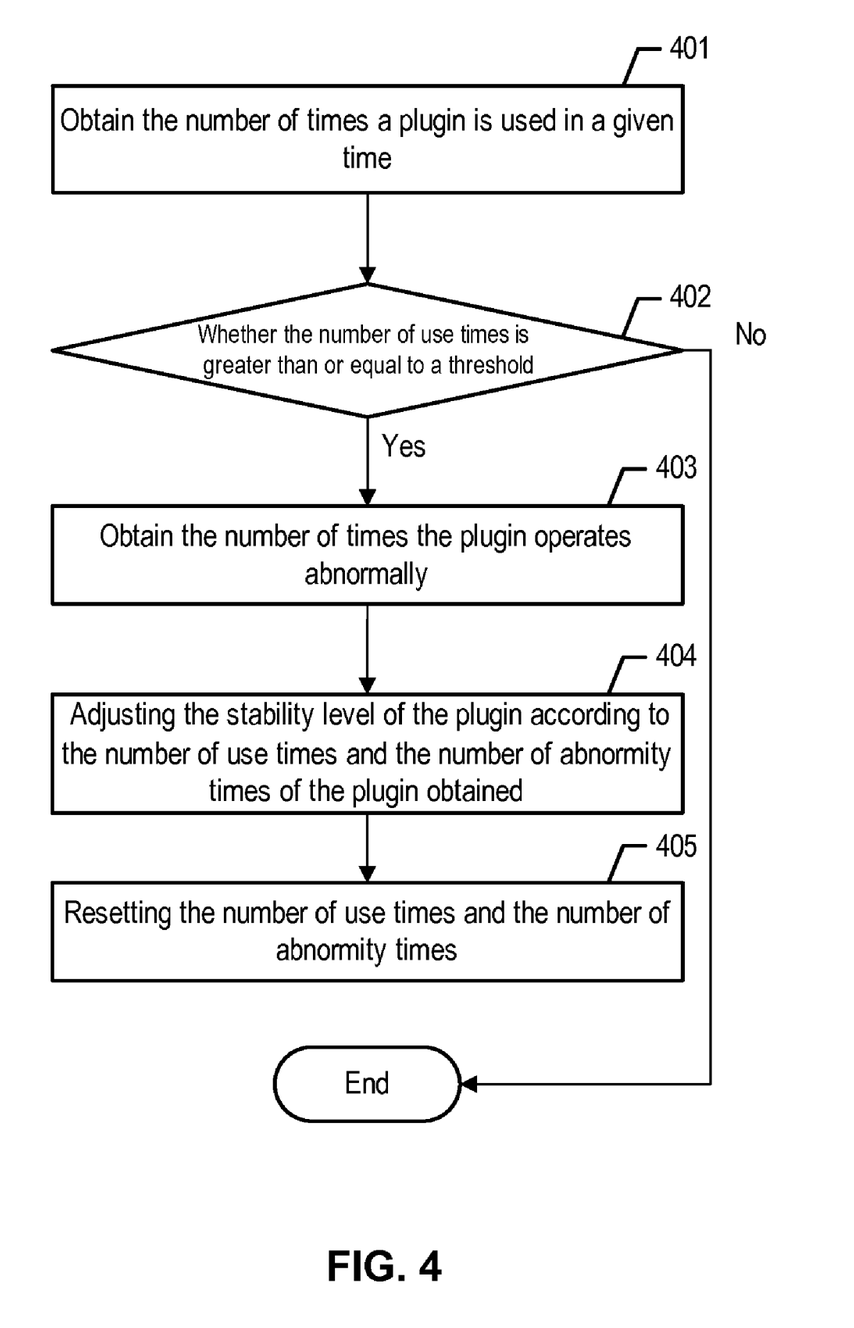
FIG. 4 is a flowchart illustrating an embodiment of a process for periodically adjusting any plugin stability level.

After the abnormality information is collected, the plugin stability level may be adjusted periodically according to the abnormality information collected. FIG. 4 is a flowchart illustrating an embodiment of a process for periodically adjusting any plugin stability level. The process may be performed on a system such as 150. In this example, it is assumed that each time the plugin is restarted, it had experienced some problems and therefore tends to indicate abnormal behavior. Thus, the number of times a plugin is used during a period of time is used to measure the stability level of the plugin.

At 401, the number of times a plugin is used during a given amount of time is obtained. For example, a plugin is determined to have been run 120 times in a month. In some embodiments, each time the client accesses the server to obtain the stability level of a particular plugin, the server increments the number of times the plugin is used by 1. Thus, the number of times of each plugin is used in the given time is saved. In some embodiments, each time the client locally obtains the stability level of a plugin, the number of use times of the plugin is incremented by 1. Thus, the client can also save the number of use times of each plugin in the given amount of time.

At 402, the number of use times obtained is compared with a given threshold. When the number of use times obtained is greater than or equal to the given threshold, control is passed to 403 for adjusting the stability level; otherwise, the use rate of the plugin is not high, the stability level does not need to be adjusted, and the process ends without further action.

At 403, the number of times the plugin operates abnormally according to the abnormality information is saved. The abnormality information obtained by the client or the server each time includes plugin information. Therefore, the number of times the plugin operates abnormally (e.g., abnormality occurred 30 times in one month) during a given amount of time may be determined by examining the plugin information.

At 404, the stability level of the plugin is adjusted according to the number of times the plugin is used and the number of times the plugin behaved abnormally. In one example, three stability levels are used, namely stable, ordinary, and unstable. An upper limit threshold and a lower limit threshold are set. When the value obtained by dividing the number of times the plugin behaved abnormally by the number of times the plugin is used is greater than or equal to the upper limit threshold, the stability level of the plugin is unstable; when the value obtained by dividing the number of times abnormality occurred by the number of times the plugin is used is less than or equal to the lower limit threshold, the stability level of the plugin is stable; when the value obtained by dividing the number of abnormality times by the number of use times falls between the lower limit threshold and the upper limit threshold, the stability level of the plugin is ordinary. For example, the initial stability level of the plugin is ordinary, the number of use times in the current adjustment period such as a month is 120 times, and the number of abnormality times is 30. If the upper limit threshold is 20%, and the lower limit threshold is 5%, since 30/120=25% which is greater than the threshold of 20%, the stability level of the plugin will be adjusted as unstable.

In other embodiments, different number of stability levels may be used. For example, some embodiments use only two stability levels, stable and ordinary, and only one threshold needs to be set. When the value obtained by dividing the number of abnormality times by the number of use times is greater than the threshold, the stability level of the plugin is ordinary; otherwise, it is stable. There may also be four stability levels set as stable, relatively stable, ordinary, and unstable, thus three thresholds need to be set, respectively as the first threshold, the second threshold, and the third threshold, with decreasing threshold values. Thus, when the value obtained by dividing the number of abnormality times by the number of use times is greater than or equal to the first threshold, the stability level of the plugin is unstable; when the value obtained by dividing the number of abnormality times by the number of use times is greater than or equal to the second threshold and less than the first threshold, the stability level of the plugin is ordinary; when the value obtained by dividing the number of abnormality times by the number of use times is greater than or equal to the third threshold and less than the second threshold, the stability level of the plugin is relatively stable; and when the value obtained by dividing the number of abnormality times by the number of use times is less than the third threshold, the stability level of the plugin is stable.

At 405, the number of use times and the number of abnormality times are reset. In some embodiments, counters used to track the numbers are cleared for the next adjustment cycle.

In some embodiments, various plugin stability levels and a plurality of shared loader processes are used. For example, a number of stability levels, stable, relatively stable, ordinary, and unstable are used. All plugins that are deemed stable are run in one shared loader process and all plugins deemed relatively stable are run in another shared loader process. Accordingly, when the stability level obtained is stable, the corresponding plugin execution mode causes the plugin to run in a first shared loader process; when the stability level obtained is relatively stable, the corresponding plugin execution mode causes the plugin to run in a second shared loader process; when the stability level obtained is ordinary, the corresponding plugin execution mode causes the plugin to run the plugin by starting an independent loader process; and when the stability level obtained is unstable, the corresponding plugin execution mode causes the execution of the plugin to be aborted. The corresponding relationships between the stability levels and the plugin execution modes are saved.

Figure 5:
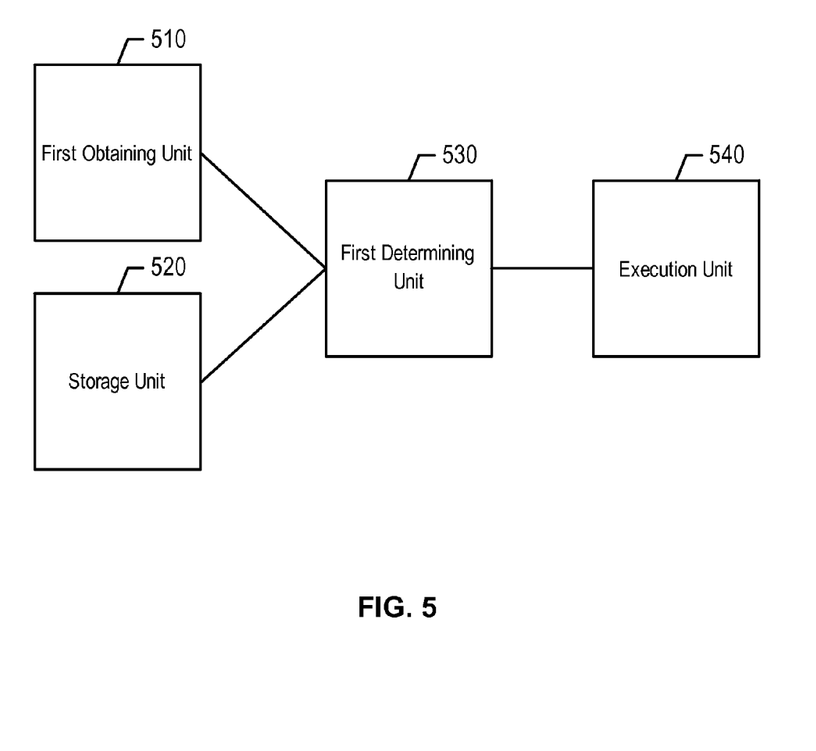
FIG. 5 is a block diagram illustrating an embodiment of a client system configured to execute plugins.

FIG. 5 is a block diagram illustrating an embodiment of a client system configured to execute plugins. The system includes a first obtaining unit 510, a storage unit 520, a first determining unit 530, and an execution unit 540. In this and following examples, the units and subunits included in the system may be implemented as software components executing on one or more processors, as hardware such as programmable logic devices and/or Application Specific Integrated Circuits designed to perform certain functions or a combination thereof. In some embodiments, the units and subunits can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units and subunits included in the system may be implemented on a single device or distributed across multiple devices.

The first obtaining unit 510 is adapted to obtain a stability level of a plugin to be executed. The storage unit 520 is adapted to save the corresponding relationships between stability levels and execution modes.

The first determining unit 530 is adapted to determine a plugin execution mode corresponding to the obtained stability level according to the corresponding relationship between stability level and execution mode that is saved in the storage unit 520; and The execution unit 540 is adapted to run the plugin to be executed according to the plugin execution mode determined.

In some embodiments, each of the above units is an independent program in the client. In some embodiments, the functions of the first obtaining unit 510, the storage unit 520, and the first determining unit 530 are performed by a core application and the functions of the execution unit 540 are performed by a loader process.

Moreover, the client further includes a second obtaining unit, which is adapted to obtain abnormality information of plugin execution, including reason for the abnormal behavior and plugin information of the plugin. The storage unit 520 is further adapted to store the abnormality information.

Thus, after a given time is triggered, the client determines the number of times a plugin becomes abnormal in a given time according to the abnormality information saved in the storage unit and adjusts the stability level of the plugin according to the number of abnormality times. Specifically, the client may obtain the plugin information of a plugin of which the number of use times in the given time exceeds a threshold, determine the number of times the plugin information obtained becomes abnormal in a given time according to the abnormality information saved, adjust the stability level of the plugin according to the number of abnormality times, and reset the number of abnormality times and the number of use times.

In some embodiments, the client may also include a sending unit, which is adapted to send the abnormality information that is obtained by the second obtaining unit.

Figure 6:
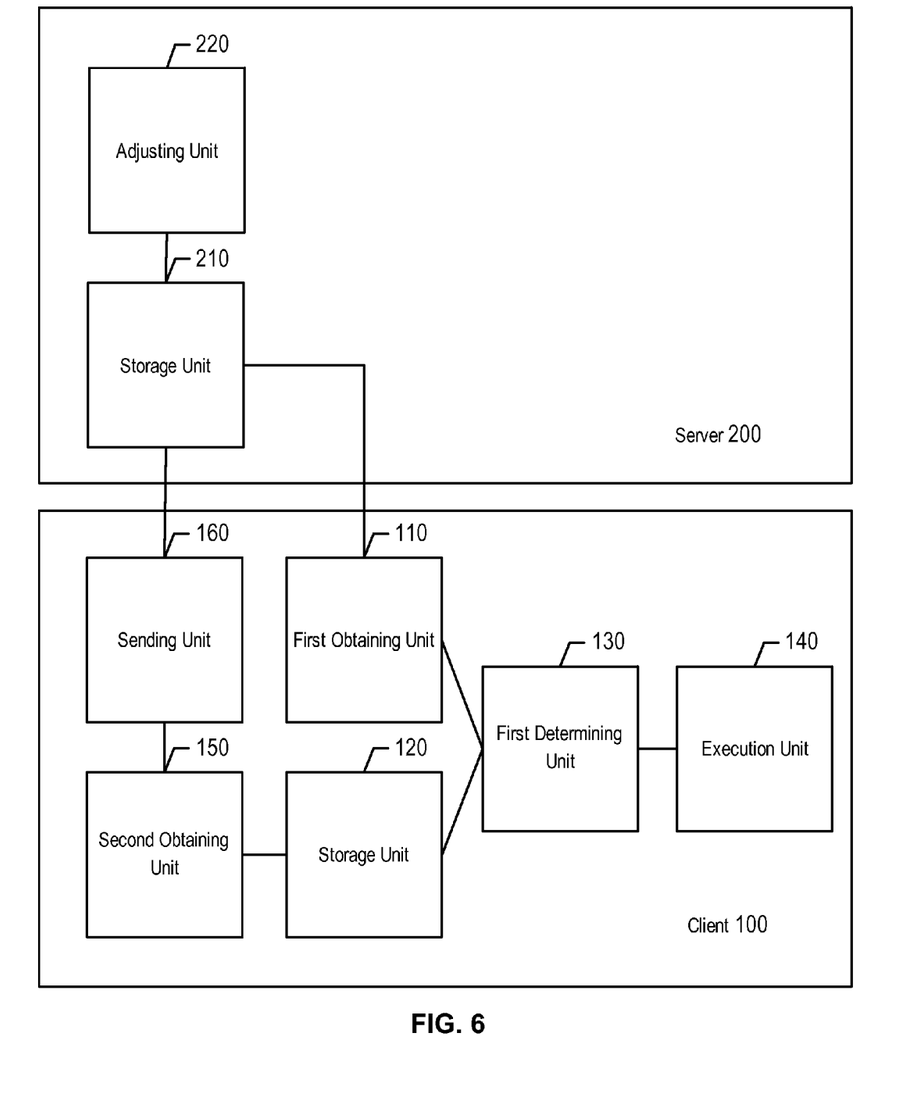
FIG. 6 is a block diagram illustrating an embodiment of a system for executing a plugin.

In an embodiment of this application, the stability level of the plugin to be executed may be obtained from the plugin stability levels saved in a server. FIG. 6 is a block diagram illustrating an embodiment of a system for executing a plugin. In this example, the system includes a client 100 and a server 200.

Client 100 is adapted to obtain a stability level of a plugin to be executed from the plugin stability levels saved in server 200, determine a plugin execution mode corresponding to the obtained stability level according to a saved corresponding relationship between stability level and execution mode, and run the plugin to be executed according to the plugin execution mode determined. Server 200 is adapted to save the plugin stability levels.

As shown, client 100 includes: a first obtaining unit 110, a storage unit 120, a first determining unit 130, and an execution unit 140, where first obtaining unit 110 is adapted to obtain the stability levels of a plugin to be executed. Storage unit 120 is adapted to save corresponding relationships between stability levels and execution modes.

First determining unit 130 is adapted to determine the plugin execution mode corresponding to the obtained stability level according to the corresponding relationship between stability level and execution mode that is saved in storage unit 120.

Execution unit 140 is adapted to run the plugin to be executed according to the plugin execution mode determined. Client 100 further includes a second obtaining unit 150, which is adapted to obtain the abnormality information of plugin execution; then, storage unit 120 is further adapted to store the abnormality information.

When the execution of a plugin by client 100 becomes abnormal, client 100 further includes a sending unit 160, which is adapted to obtain the abnormality information of the plugin and sending the abnormality information to server 200, where the abnormality information includes the reason for abnormal behavior and plugin information of the plugin.

Furthermore, server 200 includes a storage unit 210, which is adapted to not only save the plugin stability levels, but also receive and save the abnormality information. Service 200 further includes an adjusting unit 220, which is adapted to determine the number of times a plugin becomes abnormal in a given time according to the abnormality information saved in the storage unit 210 after a predetermined amount of time lapses, and adjust the stability level of the plugin according to the number of times.

In various embodiments, the stability level of a plugin to be executed is obtained, the plugin execution mode corresponding to the obtained stability level is determined according to a saved corresponding relationship between stability level and execution mode, and the plugin to be executed is run according to the plugin execution mode determined. Thus, plugins of different stability levels may be run in different loader processes and the situation in which the core application breaks down due to the instability of a plugin may be avoided and the stability of a network tool may be improved. By running plugins with high stability and of the same stability level in one shared loader, the system resources of the client may be saved and the stability of the client system may be improved. Moreover, by collecting the abnormality information of a plugin and dynamically adjusting the stability level of the plugin, an unstable plugin may be eliminated, thus user experience may be improved.

It will be appreciated that one skilled in the art may make various modifications and alterations to the present invention without departing from the spirit and scope of the present invention. Accordingly, if these modifications and alterations to the present invention fall within the scope of the claims of the present invention and their equivalents, the present invention intends to include all these modifications and alterations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for executing a plugin, comprising:
    obtaining a stability level of the plugin to be executed prior to a current execution of the plugin, wherein the stability level of the plugin is determined based at least in part on a stored mapping between the plugin and one of a plurality of possible stability levels;
    determining a plugin execution mode based at least in part on the stability level, the plugin execution mode being selected from a plurality of available plugin execution modes; and
    executing the plugin according to the plugin execution mode determined.

2. The method of claim 1, wherein the stability level of the plugin is obtained from a storage location.

3. The method of claim 1, wherein the plurality of plugin execution modes correspond to a plurality of available plugin stability levels.

4. The method of claim 1, wherein:
    the plurality of plugin execution modes correspond to a plurality of loader processes; and
    executing the plugin according to the plugin execution mode determined includes starting a loader process among the plurality of loader processes that corresponds to the plugin execution mode determined to load the plugin.

5. The method of claim 4, wherein in the event that the stability level of the plugin is stable, the loader process is a shared loader process.

6. The method of claim 4, wherein in the event that the stability level of the plugin is ordinary, the loader process is an independent loader process.

7. The method of claim 4, wherein in the event that the stability level of the plugin is unstable, the method further comprising aborting execution of the plugin.

8. The method of claim 4, wherein in the event that the stability level of the plugin is unstable, the method further comprising obtaining and saving the abnormality information of the plugin.

9. The method of claim 8, wherein the abnormality information comprises reason for abnormal behavior of the plugin and plugin information of the plugin.

10. The method of claim 1, further comprising adjusting the stability level of the plugin.

11. The method of claim 10, wherein adjusting the stability level of the plugin comprises:
    determining a number of times the plugin behaved abnormally during a given amount of time; and
    adjusting the stability level of the plugin based at least in part on the determination of the number of times the plugin behaved abnormally during a given amount of time.

12. A system for executing a plugin, comprising:
    one or more processors configured to:
        obtain a stability level of the plugin to be executed prior to a current execution of the plugin, wherein the stability level of the plugin is determined based at least in part on a stored mapping between the plugin and one of a plurality of possible stability levels;
        determine a plugin execution mode based at least in part on the stability level, the plugin execution mode being selected from a plurality of available plugin execution modes; and
        execute the plugin according to the plugin execution mode determined; and one or more memories coupled to the one or more processors, configured to provide the one or more processors with instructions.

13. The system of claim 12, wherein the stability level of the plugin is obtained from a storage location.

14. The system of claim 12, wherein the plurality of plugin execution modes correspond to a plurality of available plugin stability levels.

15. The system of claim 12, wherein:
the plurality of plugin execution modes correspond to a plurality of loader processes; and
executing the plugin according to the plugin execution mode determined includes starting a loader process among the plurality of loader processes that corresponds to the plugin execution mode determined to load the plugin.

16. The system of claim 15, wherein in the event that the stability level of the plugin is stable, the loader process is a shared loader process.

17. The system of claim 15, wherein in the event that the stability level of the plugin is ordinary, the loader process is an independent loader process.

18. The system of claim 15, wherein in the event that the stability level of the plugin is unstable, the one or more processors are further configured to abort execution of the plugin.

19. The system of claim 15, wherein in the event that the stability level of the plugin is unstable, the one or more processors are further configured to obtain and save the abnormality information of the plugin.

20. The system of claim 12, wherein the one or more processors are further configured to adjust the stability level of the plugin.

21. The system of claim 20, wherein adjusting the stability level of the plugin comprises:
determining a number of times the plugin behaved abnormally during a given amount of time; and
adjusting the stability level of the plugin based at least in part on the determination of the number of times the plugin behaved abnormally during a given amount of time.

22. A computer program product for executing a plugin, the computer program product being embodied in a computer readable storage medium and comprising computer instructions for:
obtaining a stability level of the plugin to be executed prior to a current execution of the plugin, wherein the stability level of the plugin is determined based at least in part on a stored mapping between the plugin and one of a plurality of possible stability levels;
determining a plugin execution mode based at least in part on the stability level, the plugin execution mode being selected from a plurality of available plugin execution modes; and
executing the plugin according to the plugin execution mode determined.

* * * * *